United States Patent
Eppley et al.

(10) Patent No.: US 7,644,064 B2
(45) Date of Patent: Jan. 5, 2010

(54) SYSTEMS AND METHODS FOR FILTER TABLE OPTIMIZATION

(75) Inventors: Geary L. Eppley, Carnation, WA (US); Umesh Madan, Bellevue, WA (US); David Wortendyke, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 205 days.

(21) Appl. No.: 10/782,254

(22) Filed: Feb. 19, 2004

(65) Prior Publication Data

US 2005/0198065 A1 Sep. 8, 2005

(51) Int. Cl.
*G07F 17/30* (2006.01)
(52) U.S. Cl. .................. 707/3; 707/2; 707/4; 707/5; 707/101; 707/104.1
(58) Field of Classification Search .............. 707/2, 707/3, 4, 5, 101, 104.1
See application file for complete search history.

(56) References Cited

U.S. PATENT DOCUMENTS 5,668,987 A * 9/1997 Schneider ............... 707/3
7,136,899 B1 * 11/2006 Campailla .............. 709/206

OTHER PUBLICATIONS

Altinel, Mehmet, et al., Efficient Filtering of XML Documents for Selective dissemination of Information, 2000, Proceedings of the 26th VLDB Conference, pp. 53-64.*
Graefe, Goetz, et al., "Dynamic Query Evaluation Plans," 1989, ACM, Proceedings of the 1989 ACM SIGMOD International Conference on Management Data, pp. 358-366.*

* cited by examiner

*Primary Examiner*—Neveen Abel Jalil
*Assistant Examiner*—Farhan M Syed
(74) *Attorney, Agent, or Firm*—Lee & Hayes, PLLC (57) ABSTRACT

At least one implementation described herein relates to using multiple filter engines to optimize query processing. A filter engine comprises a general matcher and at least one optimized matcher, a matcher being a filter engine in its own right. When the filter engine receives an input, the input is analyzed to determine if it can be handled by the optimized matcher. While the general matcher is fully compliant with a query language, the optimized matcher only handles a subset of the query language. Therefore, inputs that can be processed in the optimized matcher are compared against fewer filters, making the filtering process more efficient. The filter engine may also process only a portion of an input in the optimized matcher and another portion of the input in the general matcher, which reduces processing overhead.

19 Claims, 4 Drawing Sheets

SYSTEMS AND METHODS FOR FILTER TABLE OPTIMIZATION

TECHNICAL FIELD

The systems and methods described herein generally relate to data processing using filters and filter tables and, more particularly, to systems and methods for optimizing filter processing by using multiple filter engines.

BACKGROUND

Computing systems—i.e. devices capable of processing electronic data such as computers, telephones, Personal Digital Assistants (PDA), etc.—communicate with other computing systems by exchanging data messages according to a communications protocol that is recognizable by the systems. A system utilizes filters to analyze messages that are sent and/or received by the system and to determine if and how the messages will be processed further.

Filter engines are used to process a diverse assortment of documents and messages against one or more filters, or queries. A filter engine may also be called an "inverse query engine." Unlike a database, wherein an input query is tried against a collection of data records, an inverse query engine inputs a data message that is tried against a collection of queries.

Most systems that utilize filter engines for processing documents and messages store multiple filters in one or more filter tables which are accessed by a filter engine when the filter engine receives an input. But the filter tables may contain thousands of entries and testing an input against each of the filters can consume a significant amount of system resources.

Filter engines developed for general use must comply with a certain language (or standard) if they are to be of use to a wide variety of applications. Compliance with a programming language requires that each and every aspect of the language be supported by a filter engine, even if most of the features provided in the language will never—or almost never—be used by some applications.

A custom filter engine may be developed for a particular application so that the filter engine is streamlined to be faster and use less system overhead. However, developing a custom filter engine adds a great deal of effort to development of an associated application and, therefore, is usually not an option preferred by developers.

Developers are therefore faced with a problem of either using a general filter engine that supports an entire language but is inefficient, or developing a custom filter engine that only support aspects of a language expected to be encountered in a specific application and is therefore more efficient.

SUMMARY

At least one implementation described herein relates to filter processing utilizing multiple filter engines in a way such that the use of multiple filter engines is transparent to a user. A filter engine includes two or more "matchers", each of which is a filter engine in its own right. One of the matchers is a general filter engine that is configured to handle all aspects of a particular language. Another matcher is an optimized filter engine that handles only a subset of the particular language. When an input is received, the input is analyzed to determine if an optimized matcher can process it. If so, the input is directed to the optimized matcher for subsequent processing. If not, the input is directed to the general matcher for processing.

When a new filter is added to the filter engine, the filter engine analyzes the new filter and determines if the filter can be supported by a grammar subset of an optimized matcher. If so, the filter is added to the optimized matcher. Otherwise, the filter is added to the general matcher.

In at least one implementation described herein, the filter engine is configured to automatically supplement or generate a matcher. As inputs are received, the filter engine recognizes patterns identified in the inputs. When a particular pattern is seen a significant number of times, the filter engine may determine that certain filters corresponding to the pattern can be isolated from a general or less-optimized matcher and added to a more optimized matcher. Also, the filter engine may create an additional optimized matcher to process inputs matching the identified pattern. By including one or more optimized matchers, many inputs may be logically evaluated against every filter in a system without having to physically compare the inputs to each filter in the system.

BRIEF DESCRIPTION OF THE DRAWINGS

A more complete understanding of exemplary systems and methods described herein may be had by reference to the following detailed description when taken in conjunction with the accompanying drawings wherein.

DETAILED DESCRIPTION

The present disclosure relates to optimizing filter table processing by utilizing a filter engine that includes multiple sub-engines, or matchers. One sub-engine is a general matcher that is fully compliant with a query language. Another sub-engine only supports a subset of the query language and, therefore, is more efficient than the general matcher. Other sub-engines may also be utilized, with each sub-engine supporting a different subset of the query language. When an input is received, the input is analyzed and directed to the optimal sub-engine that can support that particular query. Since the sub-engines are contained within a filter engine, the fact that multiple sub-engines are utilized is transparent to applications using the filter engine.

When a new filter is added to the filter engine, the filter engine is configured to analyze the new filter and determine if the filter can be associated with an optimized matcher. If the optimized matcher includes a grammar subset that supports the new filter, the new filter is associated with the optimized matcher. If the optimized matcher cannot support the new filter, then the new filter is added to the general matcher.

For discussion purposes, the terminology used herein refers to a filter engine that comprises multiple matchers, or sub-engines. The matchers represent the general and the optimized filter sub-engines discussed above. The described systems and methods refer particularly to a messaging system that includes a filter engine and one or more filter tables. The inputs received by the filter engine are messages formatted according to XML (eXtensible Markup Language), such as SOAP (Simple Object Access Protocol) messages. The filters—or queries—that make up the filter tables in the exemplary systems are written in an XML query language, such as XPath or XQuery.

Exemplary SOAP Message and XPath Query

The following is a representation of an exemplary SOAP message similar to input messages referenced throughout this document:

```
<?xml version="1.0" encoding="utf-8" ?>
<env:Envelope xmlns:env="http://www.w3.org/2003/05/soap-
    envelope"
  xmlns:wsa=http://schemas.xmlsoap.org/ws/2003/03/addressing
  xmlns:bk="http://booksellers.com/bookschema">
<env:Header>
  __<wsa:Action>http://booksellers.com/addBook</wsa:Action>
</env:Header>
<env:Body>
  <bk:Books>
    <bk:Book>
      <bk:Author>Bernard Cornwell</bk:Author>
      <bk:Title>Sharpe's Eagle</bk:Title>
      <bk:Keyword>Military</bk:Keyword>
      <bk:Keyword>Adventure</bk:Keyword>
      <bk:Keyword>Wellington</bk:Keyword>
      <bk:Keyword>Napolean</bk:Keyword>
      <bk:Keyword>Portugal</bk:Keyword>
      <bk:Keyword>Action</bk:Keyword>
      <bk:PublishDate>3-13-1984</bk:PublishDate>
    </bk:Book>
    <bk:Book>
      <bk:Author>Stephen Pressfield</bk:Author>
      <bk:Title>The Gates of Fire</bk:Title>
      <bk:Keyword>Thermopylae</bk:Keyword>
      <bk:Keyword>Sparta</bk:Keyword>
      <bk:Keyword>Persia</bk:Keyword>
      <bk:Keyword>Xerxes</bk:Keyword>
      <bk:Keyword>Leonidas</bk:Keyword>
      <bk:Keyword>Heroic</bk:Keyword>
      <bk:PublishDate>7-26-1998</bk:PublishDate>
    </bk:Book>
  </bk:Books>
</env:Body>
</env:Envelope>
```

The following is a representation of exemplary XPath queries similar to queries referenced herein.
(/env:Envelope/-env:Body/bk:Books/bk:Book/bk:
    Author="Bernard Cornwell")
(/env:Envelope/env:Body/bk:Books/bk:Book[bk:
    Author="Bernard Cornwell" or contains(bk:Author,
    "Pressfield")] and /env:Envelope/env:Header/wsa:
    Action="http://booksellers.com/addBook")
wherein the namespace prefix mapping is:
    env=http://www.w3.org/2003/05/soap-envelope
    bk=http://booksellers.com/bookschema The XPath language includes a number of features that a fully compliant filter engine must support. Even though many of the features are rarely used, such a filter engine must support them all to be compliant with the XPath language. The XPath language lends itself to the present invention particularly well for this reason, as well as the fact of its general popularity as an XML query language.

The specific examples described herein are not intended to limit the scope of the claims appended hereto. The examples merely represent but one way in which the claimed systems and methods may be implemented.

Exemplary System

Figure 1:
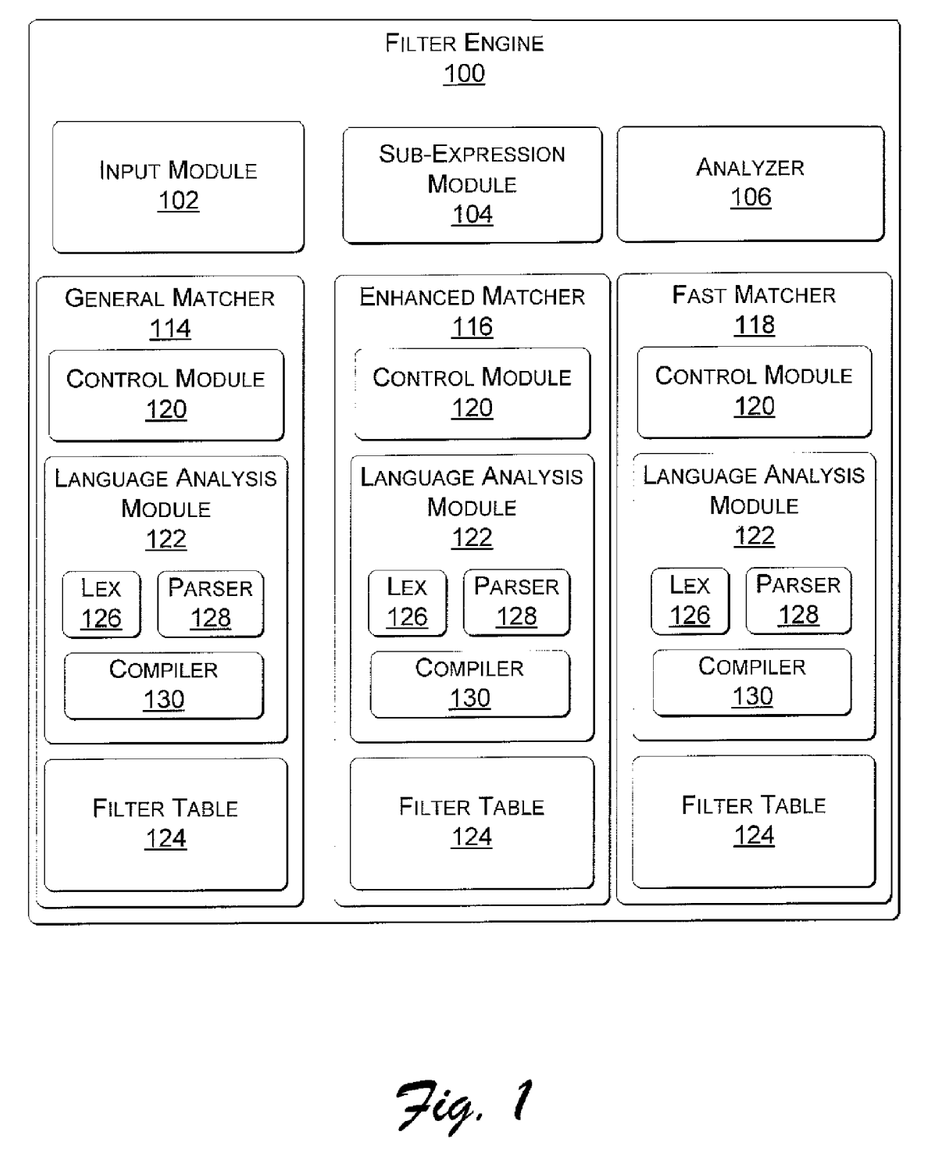
FIG. 1 is a block diagram of a filter engine in accordance with the claimed subject matter.

FIG. 1 is a block diagram of an exemplary filter engine 100 in accordance with the presently described systems and methods. Although particular elements are shown and particular functions ascribed thereto, it is noted that a system in accordance with the claimed invention may include more or less elements than those shown and that functions described may be allocated among the elements in a different manner than described below. The following description provides an example of but one implementation of the claimed invention.

The exemplary filter engine 100 includes an input module 102 that is configured to receive queries (i.e. filters) written in an XML query language (i.e. XPath or XQuery) and messages input to the filter engine. The filter engine 100 also includes a sub-expression module 104 and an analyzer 106.

The filter engine 100 also includes three matchers, which are filter engines in their own right. The three matchers are identified as a general matcher 114, an enhanced matcher 116 and a fast matcher 118. The general matcher 114 supports the entire query language. Each of the other matchers 116, 118 supports a unique subset of the query language. In this particular example, the fast matcher 118 is the most optimized matcher, i.e. the matcher that can process queries in the least amount of time. The efficient matcher 116 is optimized over the general matcher 114, but not to the extent of the fast matcher 118.

The general matcher 114 includes a control module 120, a language analysis module 122 and a filter table 124. The language analysis module 122 includes components that recognize and handle input. In the present example, the language analysis module 122 includes a lexical analysis module ("lexer") 126, a parser 128 and a compiler 130. The lexer 126 receives an input and groups characters included in the input into elemental language units (i.e. "tokens") which are then sent to the parser 128. The parser 128 analyzes the tokens received from the lexer 126 and breaks them into constituent parts according to an included grammar associated with the language elements supported by the general matcher 114. The compiler 130 translates the information from the lexer 126 and the parser 128 into byte code or machine language that the control module 120 uses to process the input against the filter table 124, which contains one or more filters.

The efficient matcher 116 and the fast matcher 118 include similar elements included in the general matcher 114. For purposes of this description, the same reference numerals are applied to the similar elements of the efficient matcher 116 and the fast matcher 118. Namely, each matcher 116, 118 contains a control module 120, a language analysis module 122, a filter table 124, a lexer 126, a parser 128 and a compiler 130.

As previously discussed, the efficient matcher 116 is optimized over the general matcher 114. Unlike the general matcher 114, the efficient matcher 116 does not support an entire query language. The efficient matcher 116 supports a grammar that is a subset of the query language grammar and, thus, filters 124 in the efficient matcher 116 conform to the grammar subset. This means that when an input message is received by the efficient matcher 116, it does not have to undertake—by a significant amount—the processing load that the general matcher 114 would have to perform. Only input messages that can be appropriately processed by filters 124 in the efficient matcher 116 are directed to the efficient matcher 116.

The analyzer 106 is configured to identify inputs that can be handled by a particular matcher by referencing the language grammar included in the parser 128 of the matcher. If terms included in an input are included in the grammar of an optimized matcher, the analyzer 106 directs the input to the optimized matcher. Conversely, if the terms are not included in the grammar of an optimized matcher, the input is directed to the general matcher 114, which can handle all inputs.

The analyzer 106 is also configured to analyze a new filter when it is added to the filter engine 100 and determine which matcher should include the new filter. Similar to the process described above, the analyzer 106 determines whether the grammar subset of an optimized matcher can support the new filter. If an optimized matcher can support the new filter, the new filter is stored in a filter table associated with the optimized matcher. Otherwise, the new filter is stored in the filter table 124 of the general matcher 114.

Since the filter engine 100 shown in FIG. 1 includes a second optimized matcher (i.e. the fast matcher 118) the analyzer 106 may also direct inputs (messages and filters) to the fast matcher 118 if the inputs contain terms that are included in a grammar subset associated with the fast matcher 118.

For purposes of this discussion, the fast matcher 118 is considered to be optimized to a greater degree over the efficient matcher 116 because the grammar subset of the fast matcher 118 is simpler than the grammar subset of the efficient matcher 116. However, several optimized matchers may be included in a filter engine without one matcher being particularly optimized to a greater degree than another matcher. In such a case, neither matcher may be particularly more optimized than the other.

Optimization

By way of example, consider a messaging system that transmits SOAP messages and utilizes filter tables consisting of XPath queries. If there are a hundred such queries in a filter table, the general matcher 114 (i.e. a general purpose matcher built using an off-the-shelf XPath engine) must test each filter against the input. In other words, the general matcher 114 must perform one hundred tries.

But the filter table may contain several queries with the following expression:

/env:Envelope/env:Header/wsa:Action="jump"

If so, it may be advantageous to include such filters in an optimized matcher (i.e. the enhanced matcher 116) such as an inverse query matcher. This optimized matcher would isolate a subset of the grammar to handle expressions similar to the one shown above. An example of such a grammar is shown below:

| | | |
|---|---|---|
| EqualityExpr | := | AbsolutePath '=' Literal |
| | | \| Literal '=' AbsolutePath |
| AbsolutePath | := | '/' RelativePath |
| RelativePath | := | Step |
| | | \| Step '/' Step |
| Step | := | NameTest |
| NameTest | := | QName |
| Literal | := | ' " ' [ " ] * ' " ' |
| | | \| " ' " [ ' ] * " ' " |

An optimized matcher written to handle this simple grammar could be further optimized by combining individual filters into a single procedure, thereby providing a substantial performance boost. One such procedure is a hash function.

Matchers are configured to receive inputs having a certain type or structure, but the inputs can have different values. A hashing function can be configured to hash a particular value of an input (e.g. jump, action, remove, skip, etc.) and immediately reference an entry in a hash table for the resultant hash value. As a result, the input does not have to be tested against each filter in the filter table of the matcher and the value must only be pulled from the input once.

For example, if messages differ in only one value, that value in a message may be hashed. If the value were "jump", then the hash table would direct control to the filter testing for the value "jump." As a result, filters testing for values of "action", "remove", "skip", etc. would not have to be tried.

In the same exemplary messaging system, it may be rare for the filter table to include filters with the following expression:

not(boolean(//*="Foo")) and starts-with(/env:Envelope/env: Header/Action, "http://xyz") or /descendant::Body/.. /ancestor::Envelope/env: Header/following-sibling::Body[.=32.333]

Such a filter would be included with the general matcher 114 instead of an optimized filter because the chances of an input satisfying the filter would be low. Including the filter in an optimized matcher would increase the complexity of the optimized matcher which would result in slowing the optimized matcher for the cases it is configured to support. Also, if such a filter were included with an optimized matcher, the filter would have to be matched against every input message, which would further reduce the efficiency of the matching process.

Automatic Generation of Optimized Matchers

Optimized matchers can be automatically generated by a filter engine in some implementations. In such an implementation, the analyzer 106 may be further configured to keep track of inputs that the filter engine 100 receives and to identify patterns that are detected more frequently than others.

When an input pattern is detected a significant number of times—either relative to an absolute threshold or as a percentage of total inputs received—the analyzer 106 can be configured to isolate filters that tend to match the dominant input pattern. A restricted grammar (i.e. a grammar subset) sufficient to handle the newly identified input pattern would be included in an optimized matcher.

For example, an analyzer may be configured to track similarity between inputs received by the filter engine. If the analyzer determines that, say, ten percent (10%) of the inputs it receives conform to a particular structure, the analyzer can set up a new or existing optimized matcher having filters to handle inputs conforming to that particular structure. Subsequent inputs having that structure would then be directed to that optimized matcher. If, in an alternative implementation, an absolute value were used, the analyzer could be configured to isolate the filters within an optimized matcher if, for example, it receives one thousand (1000) inputs of a similar structure within a specified period of time.

Other similar techniques may be implemented. In an alternative semi-automatic implementation, the analyzer 106 may track input patterns over time and record data pertaining to frequently detected patterns in a log. Based on the contents of the log, a developer may determine that an optimized matcher can be modified to handle the frequently detected patterns or that a new optimized matcher can be implemented to do so.

Gradual Roll-in of Optimized Matchers

One advantage realized by the systems and methods described herein is that a system utilizing inverse query engines may initially be implemented with only a general, off-the-shelf filter engine (i.e. a general matcher). As optimized matchers are developed, they can be rolled into the filter engine. Systems utilizing such a filter engine can thus be quickly brought online and gradually optimized as time and resources allow. Or inputs that may be optimized may only be discovered after a system has been operational for a period of time, thus requiring some time between implementation of a general matcher and implementation of an optimized matcher.

Sub-Expression Optimization

In addition to optimized matchers that handle entire inputs, the filter engine 100 can be configured to handle elements of inputs, i.e. sub-expressions, separately and to optimize processing of one or more sub-expressions of an input if possible.

Complex expressions in many languages, especially XPath, are composed of multiple sub-expressions. Instead of representing several smaller expressions, combining the expressions into a single expression is sometimes desired.

For example, consider the following two XPath expressions:
(1) (/Book/Author/Name="Melville")
(2) starts-with(/Book/Author, "Mel")

Expressions (1) and (2) can also be expressed as a single expression:
(3) (/Book/Author/Name="Melville") and starts-with (/Book/Author, "Mel")

Expression (3) can also be combined with a more complex XPath expression:
(4) /descendant:Name[.="Melville"]/ancestor::Book//*

The complex expression that results is:
(5) (/Book/Author/Name="Melville") and starts-with (/Book/Author, "Mel")or /descendant:Name [.="Melville"]/ancestor::Book//*

Expression (5) contains features such as 'descendant' and 'ancestor'. A generalized matcher could execute the entire expression, but in a sub-optimal way. Alternatively, the sub-expression module 104 (or in some implementations, the general matcher 114) could decide to delegate portions of expression (5) to the enhanced matcher 116 or the fast matcher 118. The techniques described herein would simply be applied to a portion of each expression instead of to the entire expression. For example, the sub-expression module 104 could delegate thusly:

$1 or /descendant:Name[.="Melville"]/ancestor::Book//*
where
$1=(/Book/Author/Name="Melville") and starts-with (/Book/Author, "Mel").

$1 is handled by an optimized matcher. The sub-expression module 104 first runs an optimized matcher 116, 118 to get the result for $1. Then it concludes by executing the remainder of the expression, if necessary. In this case, if $1 returned false, the matcher wouldn't need to execute the remainder of the expression.

It is noted that the sub-expression evaluation may only be used for sub-expressions that can be executed in isolation, i.e. the result of one sub-expression is not affected by the result or the action of running another sub-expression. Details of sub-expression evaluation may be implemented in any one of several ways not particularly discussed herein.

Further aspects of the elements shown and described in FIG. 1 are discussed in greater detail, below, with reference to following figures.

Exemplary Methodological Implementation

Figure 2:
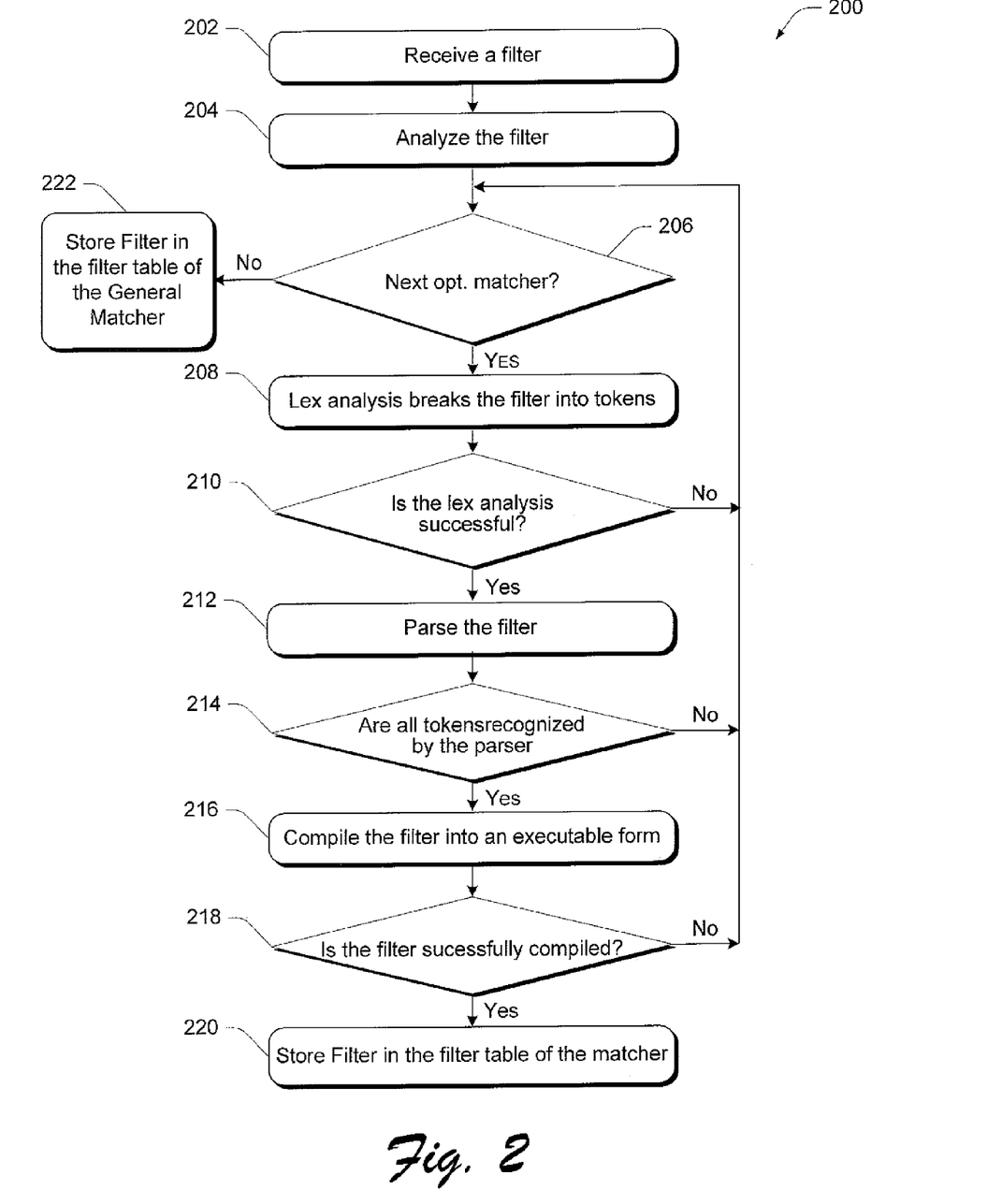
FIG. 2 is a flow diagram depicting an exemplary process to add a filter to a filter engine.

FIG. 2 is a flow diagram 200 depicting a methodological implementation of an exemplary filtering process in a filter engine that includes multiple matchers. In particular, FIG. 2 is directed to adding a new filter to a filter engine. In the following discussion, continuing reference is made to the elements and reference numerals shown in FIG. 1.

At block 202, a filter is received by the input module 102 to be stored in one of the filter tables 124 of the filter engine 100. The analyzer 106 takes control of the filter at block 204 and attempts to associate the filter with an optimized matcher 116, 118 if one is available. If there is an optimized matcher available that has not been tried ("Yes" branch, block 206), the analyzer 106 attempts to place the filter with that optimizer. Initially, the analyzer 106 begins with the most optimized matcher available—here, that is the fast matcher 118. If that matcher is not appropriate for the filter, additional optimizers are tried in order according to the level of optimization of the matchers.

At block 208, the lexer 126 breaks the filter into tokens. If that process is unsuccessful ("No" branch, block 210), the matcher cannot accept the filter and the process reverts to block 206. If the lexer 126 is successful ("Yes" branch, block 210), the parser 128 parses the filter at block 212. If the filter includes tokens that are not recognized by the parser 128, i.e. if any token is not identifiable in a grammar associated with the matcher ("No" branch, block 214), the filter is rejected. The analyzer 106 understands that this indicates that the matcher did not accept the filter into its filter table. Therefore, the analyzer 106 must try again with a different matcher at block 206.

If the parsing operation is successful ("Yes" branch, block 214), then the compiler 130 attempts to compile the filter (block 216) into an executable form. At this stage, the compiler 130 can detect operators or combinations of specific tokens that are not allowed. If such a determination is made ("No" branch, block 218) the process reverts to block 206. If the filter is successfully compiled ("Yes" branch, block 218), the filter is stored in the filter table 124 of the matcher.

If the filter is rejected by an optimized matcher, the next-most optimized matcher is tried, if one is available. If the filter is ultimately rejected by all the optimized matchers ("No-"branch, block 206), then the filter is simply stored in the filter table 124 of the general matcher 114 (block 220, 222), since the general matcher 114 can support any term in the language of the filter.

Exemplary Methodological Implementation

Figure 3:
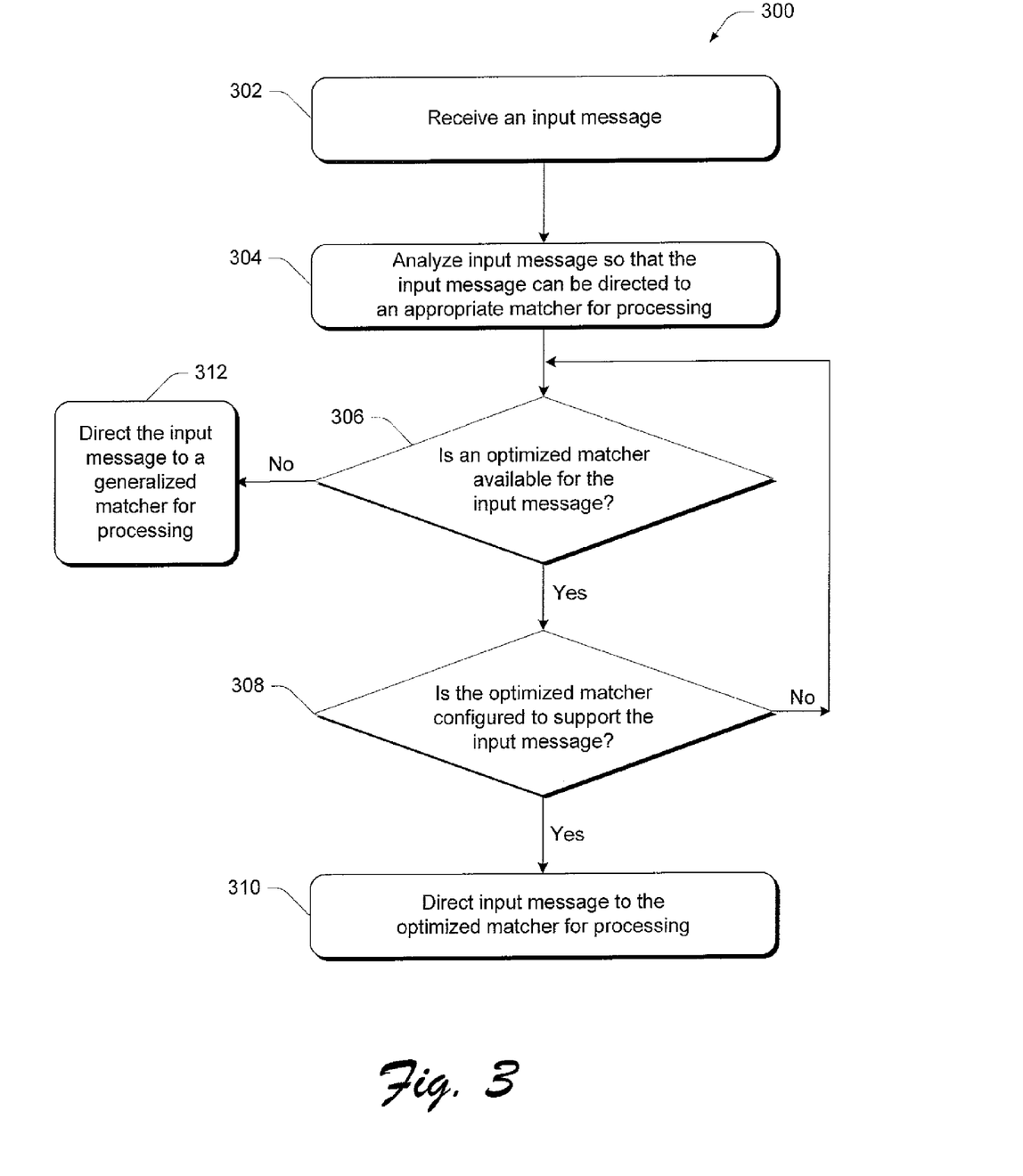
FIG. 3 is a flow diagram depicting an exemplary filtering process to process an input message.

FIG. 3 is a flow diagram 300 depicting a methodological implementation of an exemplary filtering process wherein an input message is received by the filter engine for processing against the filter tables 124. At block 302, an input message is received by the input module 102 of the filter engine 100. The analyzer 106 analyzes the input at block 304 and then tries to direct the input message to an appropriate matcher for processing.

If an optimized matcher is not available ("No" branch, block 306), the input is directed to the general matcher 114 for processing. If an optimized matcher is present in the system ("Yes" branch, block 306), then the analyzer determines if the optimized matcher is configured to support the particular input message. If the optimized matcher can process the input message ("Yes" branch, block 308), the input message is directed to the optimized filter for processing at block 310.

If the optimized matcher cannot process the input message ("No" branch, block 308), the process reverts to block 306, where the process is repeated until an appropriate optimized matcher is found or there are no optimized matchers left to try. If the input message cannot be handled by any optimized matcher, it is ultimately processed by the general matcher 114 as indicated by block 312.

Exemplary Computer Environment

Figure 4:
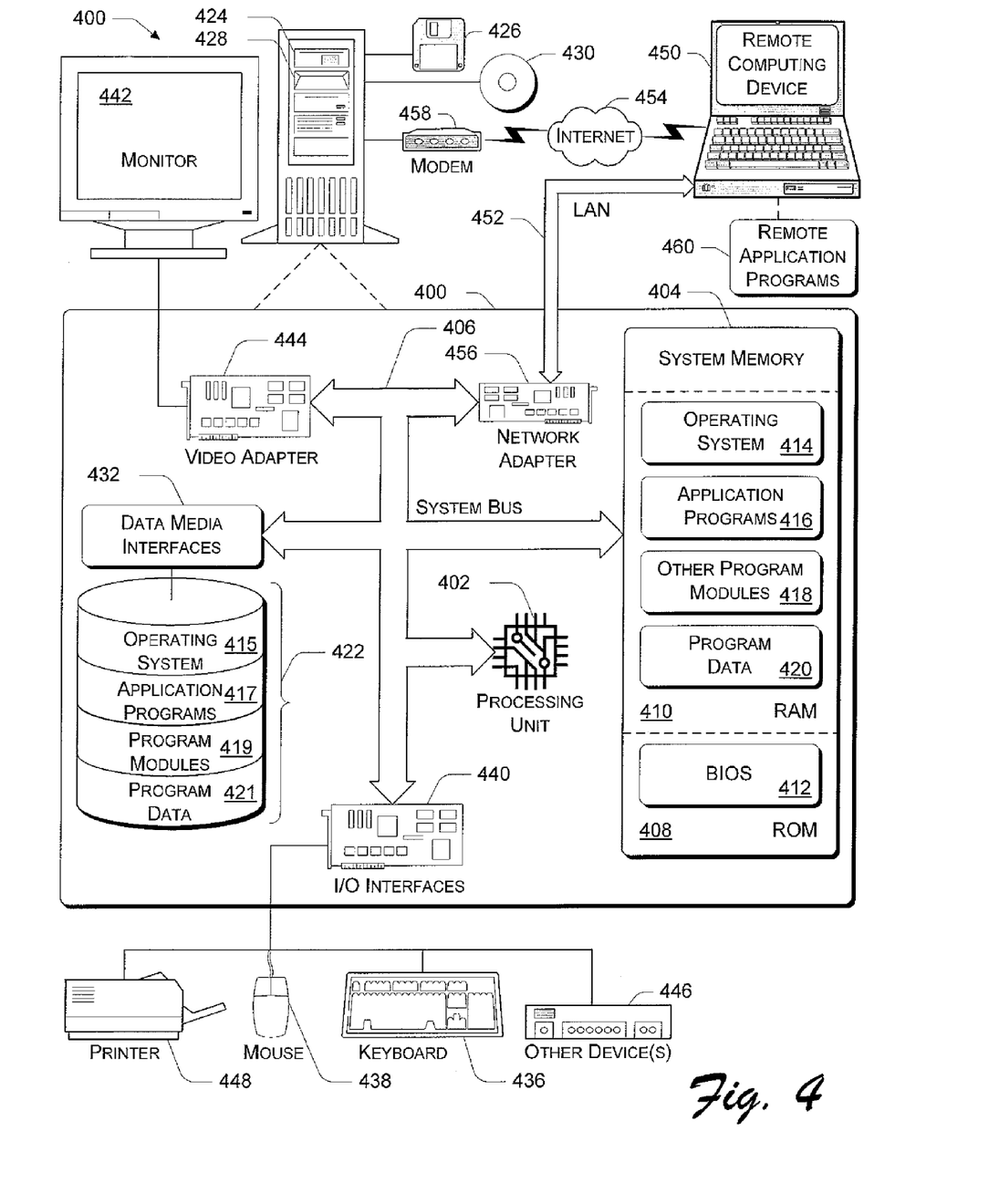
FIG. 4 is a diagram of an exemplary computing environment in which the implementations described herein may operate.

The various components and functionality described herein are implemented with a computing system. FIG. 4 shows components of typical example of such a computing system, i.e. a computer, referred by to reference numeral 400. The components shown in FIG. 4 are only examples, and are not intended to suggest any limitation as to the scope of the functionality of the invention. Furthermore, the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 402, a system memory 404, and a system bus 406 that couples various system components including the system memory to the processing unit 402. The system bus 406 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 404 includes computer storage media in the form of volatile and/or nonvolatile memory such as read only memory (ROM) 408 and random access memory (RAM) 410. A basic input/output system 412 (BIOS), containing the basic routines that help to transfer information between elements within computer 400, such as during start-up, is typically stored in ROM 408. RAM 410 typically contains data and/or program modules that are immediately accessible to and/or presently being operated on by processing unit 402. By way of example, and not limitation, FIG. 4 illustrates operating system 414, application programs 416, other program modules 418, and program data 420.

The computer 400 may also include other removable/non-removable, volatile/nonvolatile computer storage media. By way of example only, FIG. 4 illustrates a hard disk drive 422 that reads from or writes to non-removable, nonvolatile magnetic media, a magnetic disk drive 424 that reads from or writes to a removable, nonvolatile magnetic disk 426, and an optical disk drive 428 that reads from or writes to a removable, nonvolatile optical disk 430 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 422 is typically connected to the system bus 406 through a non-removable memory interface such as data media interface 432, and magnetic disk drive 424 and optical disk drive 428 are typically connected to the system bus 406 by a removable memory interface.

The drives and their associated computer storage media discussed above and illustrated in FIG. 4 provide storage of computer-readable instructions, data structures, program modules, and other data for computer 400. In FIG. 4, for example, hard disk drive 422 is illustrated as storing operating system 415, application programs 417, other program modules 419, and program data 421. Note that these components can either be the same as or different from operating system 414, application programs 416, other program modules 418, and program data 420. Operating system 415, application programs 417, other program modules 419, and program data 421 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone, joystick, game pad, satellite dish, scanner, or the like. These and other input devices are often connected to the processing unit 402 through an input/output (I/O) interface 440 that is coupled to the system bus, but may be connected by other interface and bus structures, such as a parallel port, game port, or a universal serial bus (USB). A monitor 442 or other type of display device is also connected to the system bus 406 via an interface, such as a video adapter 444. In addition to the monitor 442, computers may also include other peripheral output devices 446 (e.g., speakers) and one or more printers 448, which may be connected through the I/O interface 440.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 440, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

CONCLUSION

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method comprising:
receiving an input of data, the input data conforming to a query language used by a filter engine comprising two or more filter sub-engines, wherein at least one filter sub-engine is a general filter sub-engine and at least one filter sub-engine is an optimized filter sub-engine, and wherein the query language is based on eXtensible Markup Language (XML), wherein the query language is XPath;
determining whether the input data conforms to a grammar associated with the optimized filter sub-engine, wherein the optimized filter sub-engine is configured to handle only a subset of the query language handled by the general filter sub-engine;
in an event the determining indicates the input data conforms to the grammar associated with the optimized filter sub-engine;
determining whether the input data can be processed by the optimized filter sub-engine, the determining comprising identifying if the input data comprises a subset of the query language; and
directing the input data to the optimized filter sub-engine for processing;
in an event the determining indicates that the input data cannot be processed by the optimized filter sub-engine;
determining whether the input data can be processed by a second optimized filter sub-engine, wherein the second optimized filter sub-engine is configured to handle only a subset of the query language, and wherein the subset of the query language that the second optimized filter sub-engine is configured to handle excludes the subset of the query language that the first optimized filter sub-engine is configured to handle; and
directing the input data to the second optimized filter sub-engine for processing;
in an event the determining indicates that the input cannot be processed by the second optimized filter sub-engine, directing the input to the general filter sub-engine for processing, wherein the general filter sub-engine is configured to handle all aspects of the query language; and
processing the input to derive a result.

2. The method as recited in claim 1, the method further comprising:
parsing the input to identify first and second sub-expressions;
determining whether the first sub-expression can be processed by the optimized filter sub-engine;
in an event the first sub-expression can be processed by the optimized filter sub-engine, directing the first sub-expression to the optimized filter sub-engine for processing;
in an event the first sub-expression cannot be processed by the optimized filter sub-engine, directing the first sub-expression to the general filter sub-engine for processing;
determining whether the second sub-expression can be processed by the optimized filter sub-engine;
in an event the second sub-expression can be processed by the optimized filter sub-engine, directing the second sub-expression to the optimized filter sub-engine for processing; and
in an event the second sub-expression cannot be processed by the optimized filter sub-engine, directing the second sub-expression to the general filter sub-engine for processing.

3. The method as recited in claim 2, further comprising:
obtaining a result of the processing of the first sub-expression; and
processing the second sub-expression only if the result of the first sub-expression is true.

4. A filter engine system comprising:
a processor coupled to a memory, the memory configured with instructions for implementing;
an optimized filter sub-engine configured to accept an input that conforms to a language and process the input against a filter table associated with the optimized filter sub-engine, wherein the optimized filter sub-engine is configured to process only a subset of terms of the language, wherein the subset of terms of the language does not include all terms of the language, and wherein the language comprises a query language based on eXtensible Markup Language (XML), wherein the query language is XPath;
a general filter sub-engine configured to accept the input and process the input against a filter table associated with the general filter sub-engine, wherein the general filter sub-engine is configured to process all terms of the input language; and
an analyzer configured to determine whether the input can be processed by the optimized filter sub-engine and, if so, direct the input to the optimized filter sub-engine for processing, or if not, direct the input to the general filter sub-engine for processing.

5. The filter engine system as recited in claim 4, wherein the analyzer is further configured to analyze a new filter added to the filter engine and to determine an appropriate filter sub-engine with which to associate the new filter.

6. The filter engine system as recited in claim 4, wherein the language additionally comprises XML Path Language (XPath).

7. The filter engine system as recited in claim 4, wherein the analyzer is further configured to determine whether the optimized filter sub-engine can process the input by comparing the input to a grammar associated with the optimized filter sub-engine and determining whether the input consists of terms that are compatible with the grammar.

8. The filter engine system as recited in claim 4, further comprising a sub-expression module that is configured to perform acts comprising:
   determine whether the input consists of different sub-expressions;
   in an event the input consists of different sub-expressions, directing each of the different sub-expressions contained in the input to the analyzer, wherein the analyzer is further configured to determine whether each of the different sub-expressions can be processed by the optimized filter sub-engine and to direct each of the different sub-expressions to an appropriate filter sub-engine for processing.

9. The filter engine system as recited in claim 8, wherein a first of the different sub-expressions is directed to the optimized filter sub-engine and a second of the different sub-expressions is directed to the general filter sub-engine.

10. The filter engine system as recited in claim 4, wherein the optimized filter sub-engine comprises:
    a first optimized filter sub-engine configured to process inputs that conform to a first subset of the language; and
    a second optimized filter sub-engine configured to process inputs that conform to a second subset of the language;
    wherein the first subset of the language is different from the second subset of the input language.

11. A computer-readable storage medium encoded with instruction that, when executed by a processor of a device, causes the device to perform acts comprising:
    determining an appropriate filter sub-engine to which an input message should be directed for processing against a set of queries;
    processing the input message using an optimized filter sub-engine if the optimized filter sub-engine comprises a grammar that supports processing of the input message;
    processing the input message in a general filter sub-engine if the optimized filter sub-engine grammar does not support processing of the input message; and
    wherein:
      the input message is in accordance with a query language based on eXtensible Markup Language (XML), wherein the query language is XPath;
      the optimized filter sub-engine supports a subset, less than the whole, of the query language; and
      the general filter sub-engine supports the entire query language.

12. The computer-readable storage medium as recited in claim 11, further comprising computer-executable instructions that, when executed, direct the computing system to perform acts comprising:
    accept input messages for both the optimized filter sub-engine and the general filter sub-engine by way of a single input means so that an input message sending application is not required to distinguish between the optimized filter sub-engine and the general filter sub-engine.

13. The computer-readable storage medium as recited in claim 11, wherein the query language is XPath.

14. The computer-readable storage medium as recited in claim 11, wherein the query language is an XML query language.

15. The computer-readable storage medium as recited in claim 11, further comprising computer-executable instructions that, when executed, direct the computing system to perform acts comprising:
    prior to determining which filter sub-engine will process the input message, parse the input message into two or more sub-expressions;
    for each of the two or more sub-expressions, determine an appropriate filter sub-engine that can process the sub-expression; and
    direct each of the two or more sub-expressions to the appropriate filter sub-engine for processing.

16. The computer-readable storage medium as recited in claim 15, further comprising computer-executable instructions that, when executed, direct the computing system to derive a final result of the input message processing from at least one result of the sub-expression processing.

17. The computer-readable storage medium as recited in claim 15, further comprising computer-executable instructions that, when executed, direct the computing system to perform acts comprising:
    determine if a first of the two or more sub-expressions evaluates true;
    proceed with processing of subsequent sub-expressions of the two or more sub-expressions if the first sub-expression evaluates to true; and
    forego processing of subsequent sub-expressions of the two or more sub-expressions if the first sub-expression evaluates to false.

18. The computer-readable storage medium as recited in claim 11, wherein each filter sub-engine includes a set of queries against which input messages directed to the respective filter sub-engine are tried, and wherein each set of queries is unique.

19. The method as recited in claim 1, wherein:
    determining comprises generating a hash of the input data in order to determine if an optimized sub-engine is capable of handling the input data.

* * * * *